United States Patent
Goettle et al.

(10) Patent No.: US 10,278,262 B2
(45) Date of Patent: Apr. 30, 2019

(54) SOFT SWITCH RELAY CIRCUIT

(71) Applicant: McWong Inc., Sacramento, CA (US)

(72) Inventors: Blane Goettle, Golden River, CA (US); Yan Zhou, Sacramento, CA (US); Michael Darren Musgrove, Dixon, CA (US); Andrew Judy, Sacramento, CA (US); Jesse James Graham, Vallejo, CA (US)

(73) Assignee: McWong International, Inc., Sacramento, CA (US)

( * ) Notice: Subject to any disclaimer, the term of this patent is extended or adjusted under 35 U.S.C. 154(b) by 0 days.

(21) Appl. No.: 15/932,751

(22) Filed: Apr. 19, 2018

(65) Prior Publication Data

US 2018/0315567 A1 Nov. 1, 2018

Related U.S. Application Data

(60) Provisional application No. 62/487,945, filed on Apr. 20, 2017.

(51) Int. Cl.
*H01H 47/00* (2006.01)
*H05B 37/02* (2006.01)

(52) U.S. Cl.
CPC ....... *H05B 37/0227* (2013.01); *H01H 47/002* (2013.01); *H05B 37/0218* (2013.01); *H05B 37/0272* (2013.01)

(58) Field of Classification Search
CPC .............. H01H 47/002; H05B 37/0227; H05B 33/0815
See application file for complete search history.

(56) References Cited

U.S. PATENT DOCUMENTS

| | | | | |
|---|---|---|---|---|
| 5,309,068 A | * | 5/1994 | Hakkarainen | H05B 41/36 315/226 |
| 8,686,662 B1 | * | 4/2014 | Bragg | H02J 7/345 315/159 |
| 2011/0037417 A1 | * | 2/2011 | Mix | H05B 37/0227 315/307 |
| 2011/0080681 A1 | * | 4/2011 | Maruyama | H02H 6/005 361/93.8 |
| 2011/0140611 A1 | * | 6/2011 | Elek | H05B 37/0272 315/130 |
| 2011/0187332 A1 | * | 8/2011 | Salvestrini | H05B 37/0209 323/234 |
| 2012/0169242 A1 | * | 7/2012 | Olson | H05B 37/0227 315/159 |
| 2012/0306377 A1 | * | 12/2012 | Igaki | F21V 23/0464 315/151 |
| 2014/0117858 A1 | * | 5/2014 | Jacobs | H05B 37/0218 315/152 |
| 2016/0286628 A1 | * | 9/2016 | Cho | H05B 37/0272 |

* cited by examiner

*Primary Examiner* — Dedei K Hammond
*Assistant Examiner* — Raymond R Chai
(74) *Attorney, Agent, or Firm* — James A. Gavney, Jr.; JAG Patent Services

(57) ABSTRACT

A sensor, such as a motion sensor and/or an occupancy sensor, a soft switch relay controller, or a power pack can significantly reduce the in-rush current and thereby extend the life of relays and other electrical components susceptible to damage caused by in-rush current or voltage surges. The sensor, soft switch relay controller, and/or power pack can reduce the in-rush current when enabling or disabling a light source.

5 Claims, 10 Drawing Sheets

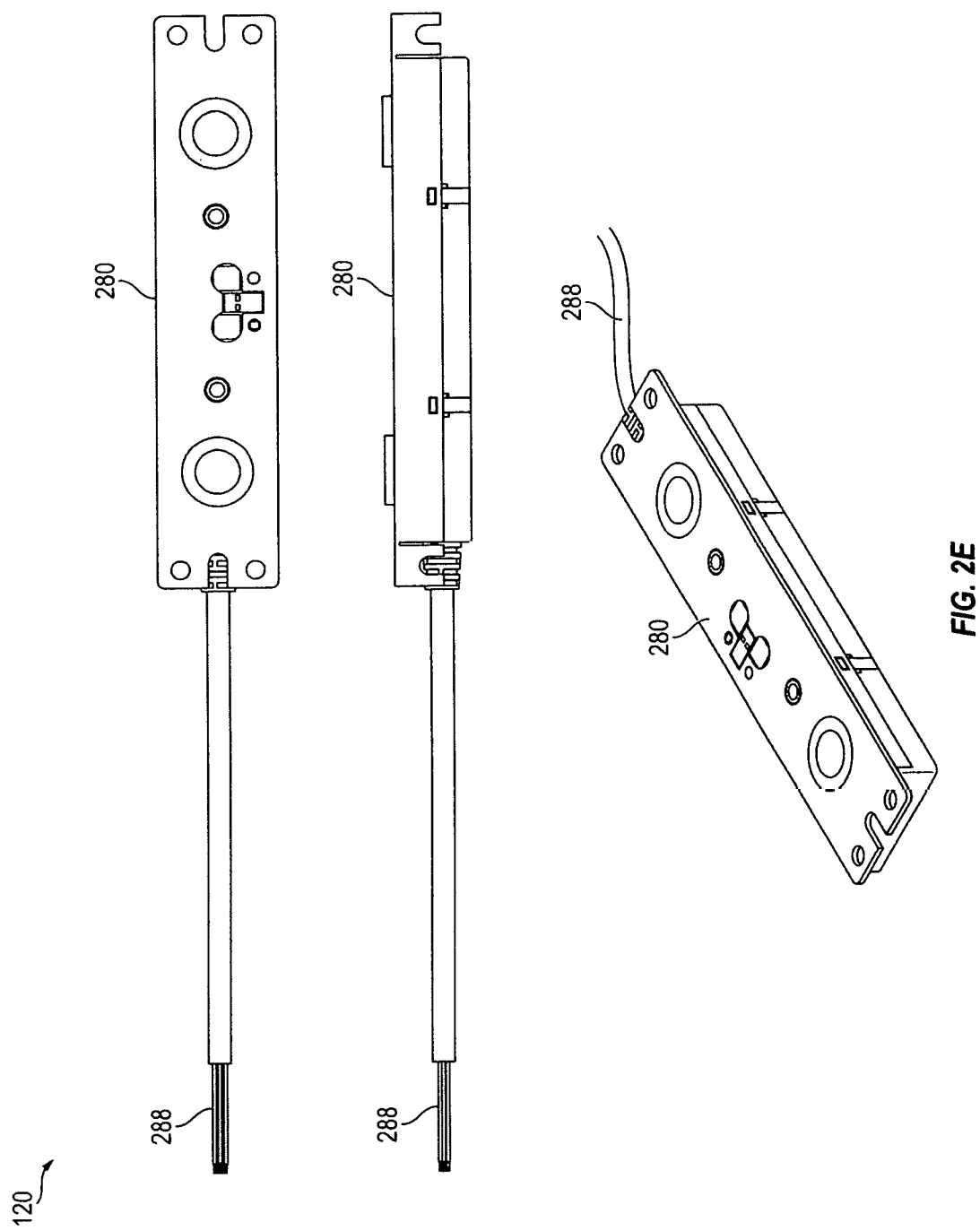

US 10,278,262 B2

SOFT SWITCH RELAY CIRCUIT

RELATED APPLICATION(S)

This application claims priority under 35 U.S.C. § 119(e) from the U.S. provisional patent application Ser. No. 62/487,945, filed on Apr. 20, 2017, and titled "SOFT SWITCH RELAY CIRCUIT." The provisional patent application Ser. No. 62/487,945, filed on Apr. 20, 2017, and titled "SOFT SWITCH RELAY CIRCUIT" is hereby incorporated by reference.

FIELD OF INVENTION

This invention is directed to a relay circuit. More specifically this invention is directed to a relay circuit that reduces damages caused by voltage surges during operation of a relay.

BACKGROUND

A relay, such as a mechanical relay, is often used to switch a load. A common example is a photocell switch installed on top of most roadway lighting fixtures. The photocell switch is designed to switch the load off when sufficient daylight is present. Similarly, the photocell switch is designed to switch the load on when sufficient daylight is not present. Mechanical relays, however, are prone to failure over time.

SUMMARY OF CERTAIN INVENTIVE ASPECTS

As described above, mechanical relays are prone to failure over time, due in part to stress on the contacts caused by in-rush current. Accordingly, described herein is a soft switch relay circuit ("SSRC") that includes an electric circuit that executes instructions for switching loads. The SSRC may significantly reduce the in-rush current and thereby extend the life of relays and other electrical components susceptible to damage caused by in-rush current or voltage surges. For example, prior to switching the relay contacts, the SSRC may transmit a signal to substantially lower the current draw of the load, placing the system in a temporary minimum power state. Once the load is in the minimum power state (e.g., drawing minimal current), the SSRC enables switching of the relay. After the relay contacts are stable, the SSRC transmits another signal to increase the current draw of the load (e.g., to a maximum power state or a user-defined level), thereby returning the system to an original state.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 2E illustrates an example schematic and diagram of an ultrasonic motion sensor, according to one embodiment.

DETAILED DESCRIPTION OF CERTAIN EMBODIMENTS

Figure 1:
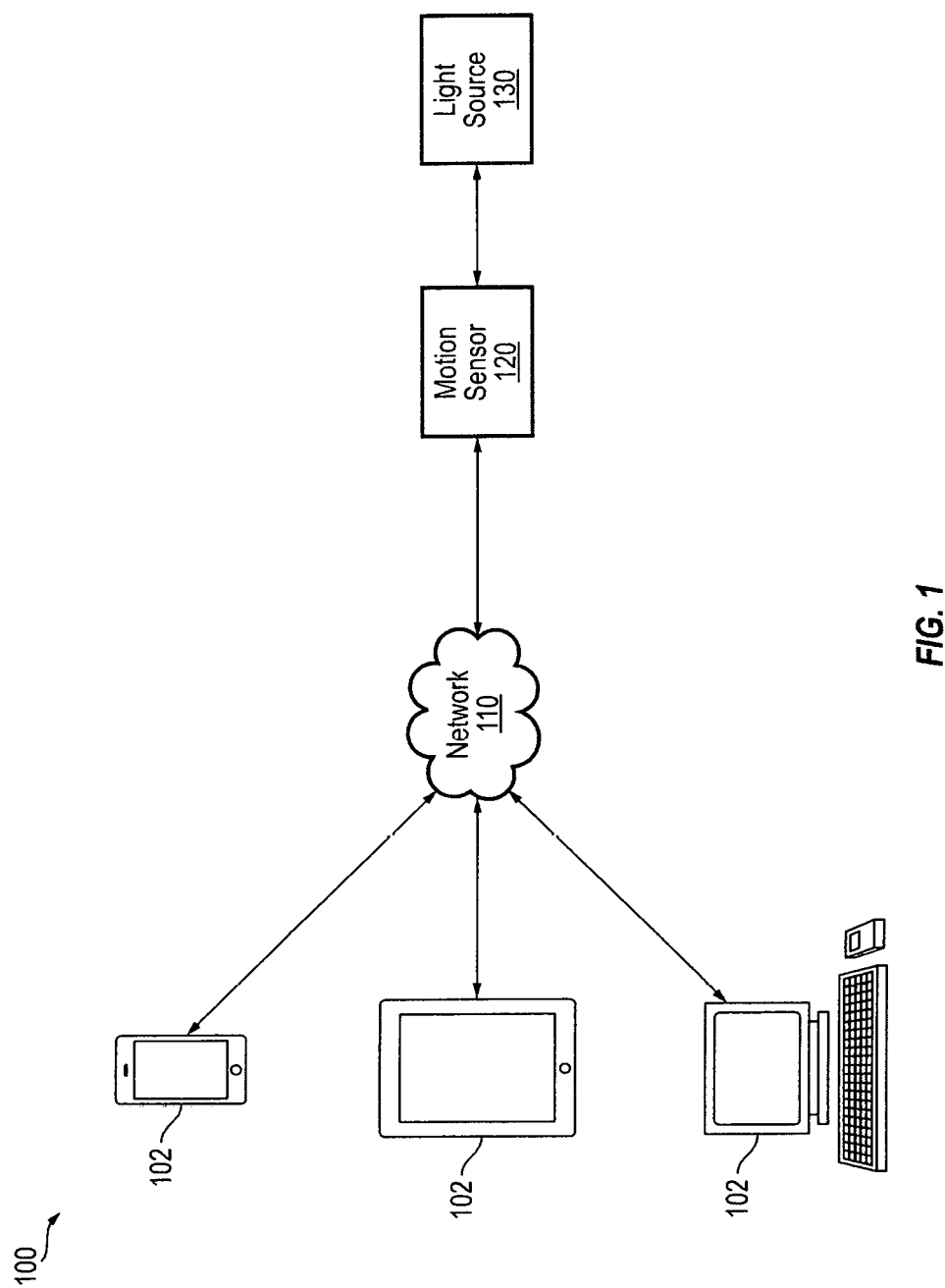
FIG. 1 illustrates a first lighting control environment that includes a motion and/or occupancy sensor that controls a light source, according to one embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claimed invention.

Introduction

As described above, mechanical relays are prone to failure over time. This can be due in part to stress on the contacts caused by in-rush current. For example, a mechanical relay may include contacts that, when touching, result in a closed relay and that, when not touching, result in an open relay. As the mechanical relay transitions from an open position to a closed position, the contacts move closer together. Similarly, as the mechanical relay transitions from the closed position to the open position, the contacts move farther apart. As the contacts move closer together or farther apart, voltage jumps across the gap between the contacts. In addition, each time a relay is switched, there is a risk that if the relay switches at a time when the voltage curve is not exactly at zero, a current surge occurs. The current surge or in-rush current, along with the voltage jumping across the contact gaps, can damage the relay. In particular, sparks may occur that effectively fuse the contacts together or prevent the contacts from touching. Thus, the mechanical relay may become inoperable.

Accordingly, described herein is a soft switch relay circuit ("SSRC") that includes an electric circuit that executes instructions (e.g., referred to herein as "soft switching relay instructions") for switching loads. The SSRC may significantly reduce the in-rush current and thereby extend the life of relays and/or other electrical components susceptible to damage caused by in-rush current or voltage surges. The SSRC may achieve these benefits by decreasing the operating current that flows through a relay as the relay switches between the open and closed positions.

As an illustrative example, the SSRC can be implemented for use with a lighting fixture to control a relay coupled to a light source that causes the light source to turn on and off. For example, the SSRC can be embedded within or be coupled to a motion sensor. The motion sensor may output an active high/low signal that controls a relay, where the relay is located within a path between a power source and the light source. The motion sensor may also output a dimming signal (e.g., a 0-10V driver dimming signal) that controls a light output of the light source. When a determination is made by the motion sensor to turn on the light source (e.g., because motion is detected, ambient light is below a threshold level, etc.), the SSRC can short the dimming signal (e.g., reduce the voltage of the dimming signal) prior to the switching of the relay such that a current passing through the relay is lowered to a minimum level (e.g., 0, 1% of normal operating current, 10% of normal operating current, etc.). Once the SSRC determines that the current has reached the minimum level (e.g., based on power measurements received from a power metering circuit embedded in the relay) or after a threshold period of time (e.g., 300 ms), the SSRC enables switching of the relay. After the relay contacts are stable or no longer moving (e.g., the switching is complete, as optionally indicated by the relay) or after a threshold period of time (e.g., 300 ms), the SSRC either increases the voltage on the dimming signal (e.g., if the relay is switching the light source on) or maintains the shorting of the dimming signal (e.g., if the relay is switching the light source off). If the voltage on the dimming signal is increased, the SSRC can increase the voltage to a maximum level or to a user-defined level.

The SSRC described herein may not take the place of conventional "zero-crossing" switching methods, where the timing of the switching of a relay coincides with a point at which the AC voltage curve crosses 0V. The techniques implemented by the SSRC described herein can mitigate the risks associated with imperfect, non-zero crossings.

While the techniques disclosed herein with respect to the SSRC are described as being implemented within a motion sensor, such techniques can be applied in other contexts. For example, the techniques disclosed herein can be implemented within a power pack that functions to step down a line voltage (e.g., 120V to 277V) to a voltage desired by a motion sensor (e.g., 12V to 24V), where the power pack includes a relay used to control whether a light source receives power. As an illustrative example, when the power pack receives a message (e.g., from a motion sensor, a mechanical switch, etc.) indicating that the light source (and thus the relay) should be switched, the power pack can short or cause another component to short the dimming signal prior to causing the relay to switch and then can un-short or cause another component to un-short the dimming signal after the switching is complete (e.g., when the relay is being closed). As another example, the techniques disclosed herein can be implemented by a soft switch relay controller, which is described in greater detail below.

In some embodiments, the motion sensor, power pack, and/or soft switch relay controller are preconfigured to perform the techniques of the SSRC described herein. In other embodiments, a motion sensor, power pack, and/or soft switch relay controller in an existing installation is reconfigured to perform the techniques of the SSRC described herein. For example, the motion sensor, power pack, and/or soft switch relay controller can receive, via a network, external memory (e.g., a universal serial bus (USB) flash drive, an external hard disk, etc.), and/or the like, a set of executable instructions that, when executed, cause the motion sensor, power pack, and/or soft switch relay controller to perform the techniques of the SSRC described herein. The set of executable instructions may be defined such that they are executed according to a schedule. As an illustrative example, the motion sensor, power pack, and/or soft switch relay controller may be configured initially to turn on a light source at 8:00 pm and to turn off a light source at 6:00 am. A first executable instruction (e.g., shorting the dimming signal) can be defined to execute at 7:59 pm and at 5:59 am. The initial configuration of the motion sensor, power pack, and/or soft switch relay controller may be set such that the motion sensor, power pack, and/or soft switch relay controller enables the relay at 8:00 pm and disables the relay at 6:00 am. A second executable instruction (e.g., increasing the voltage on the dimming signal to a maximum or user-defined level) can then be defined to execute at 8:01 pm. The timings of the first and second executable instructions may be such that the relay is switched after a sufficient amount of time passes to ensure that the current passing through the relay is at a minimum level (e.g., 300 ms) and after a sufficient amount of time passes to ensure that the relay contacts are stable or not moving after the relay is switched. Accordingly, in some embodiments, timing of one or more control signals controlled by instructions provided to a lighting environment can achieve soft switching without dedicated hardware to perform the soft switching.

In addition, while embodiments of the disclosure provided herein are directed to a standalone motion sensor separate from a light source that can be coupled to various light sources, some other embodiments can be implemented in different contexts. In other embodiments, a motion sensor with integrated wireless communications capabilities can be integrated within a light source in a single housing. This integrated motion sensor and light source may communicate with other light sources that do not have integrated motion sensors to coordinate operation of the light sources based on motion detected by the motion sensor in a manner as described herein. For example, the integrated motion sensor and light source may have a 0-10V driver dimming wire and/or an active high/low wire that extends from the housing and couples to the other light sources. The integrated motion sensor and light source can output signals via the wire(s) to control the other light sources in a manner as described herein.

Furthermore, while embodiments of the disclosure provided herein are directed to a standalone motion sensor that includes an embedded communication device, any of the principles and advantages discussed herein can be applied in any suitable context. The communication device can be external to the housing of the motion sensor and the motion sensor can still function as described herein. Furthermore, the standalone device can be any occupancy sensor, such as a motion sensor, heat sensor (e.g., measures changes in temperature to identify movement), presence sensor, camera (e.g., to detect user movement), and/or the like.

System Components with a Motion Sensor

FIG. 1 illustrates a first lighting control environment 100 that includes a motion and/or occupancy sensor 120 that controls a light source 130, according to one embodiment. The first lighting control environment 100 shown in FIG. 1 includes various user devices 102, the motion sensor 120, and the light source 130. The first lighting control environment 100 may include any suitable number of distinct user devices 102, motion sensors 120, and/or light sources 130.

The various user devices 102 may communicate with the motion sensor 120 via one or more communication networks 110. The network 110 may include a private network, personal area network, local area network, wide area network, cable network, satellite network, cellular telephone network, etc. or combination thereof. The network 110 may have access to and/or from the Internet. For example, the network 110 may be a network that carries data packets packaged according to the Bluetooth protocol, an IEEE 802.11 protocol, the ZigBee protocol, and/or the like.

The user devices 102 are optional and may be present in the first lighting control environment 100 if the motion sensor 120 is not already configured with the soft switching relay instructions. For example, the user devices 102 can communicate with the motion sensor 120 to transmit the soft switching relay instructions to the motion sensor 120 for configuring the motion sensor 120 such that when the soft switching relay instructions are executed by the motion sensor 120, the execution causes the motion sensor 120 to perform the soft switching relay functionality described herein. As another example, the user devices 102 can communicate with the motion sensor 120 to transmit instructions to the motion sensor 120 to perform specific operations, such as dimming the light source 130, switching the relay, un-dimming the light source 130, and/or the like.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), external memory devices (e.g., a USB flash drive, an external hard disk, etc.), and various other electronic devices and appliances. Individual user devices 102 may execute an application, such as a mobile application, to communicate with the motion sensor 120 via the network 110. For example, the mobile application may allow a user to view and select a motion sensor 120 to configure with the soft switching relay instructions described herein.

In further embodiments, a user may use the application running on the user device 102 to adjust motion sensor settings of the motion sensor 120. For example, the motion sensor settings can include a light output level of a light source 130 when motion is first detected, a light output level of the light source 130 if motion is not detected after a first period of time, the length of time that corresponds to the first period of time, a light output level of the light source 130 if motion is not detected after a second period of time once the first period of time has passed, the length of time that corresponds to the second period of time, the sensitivity of the motion sensor, an ambient light lux level (e.g., a threshold ambient light value), and/or the like.

The motion sensor 120 can be a PIR motion sensor, a microwave motion sensor, an ultrasonic motion sensor, a CMOS motion sensor, and/or any combination thereof with wireless network communications capabilities. For example, the motion sensor 120 can include a communication PCB that includes components for communicating with the user device 102 (e.g., a Bluetooth transceiver, a Wi-Fi transceiver, etc.) and a motion sensor PCB that includes components for detecting motion (e.g., a motion detection sensor, such as a PIR sensor, a microwave sensor, an ultrasonic sensor, a CMOS sensor, and/or any combination thereof, etc.). The communication PCB can be coupled to the motion sensor PCB, as described in greater detail below. Both PCBs can be included within a single housing to form the motion sensor 120. The motion sensor 120 housing may further include a light sensor (e.g., a photo diode, a photo transistor, etc.) that detects ambient light levels. Although features may be described herein in connection with a motion sensor 120 for illustrative purposes, any suitable principles and advantages discussed herein can be implemented in connection with an occupancy sensor that can detect occupancy. An occupancy sensor can be any suitable sensor arranged to detect whether an area (e.g., a room) is occupied. In some instances, an occupancy sensor is a motion sensor that can detect occupancy based on a detecting motion. In other instances, an occupancy sensor is a heat sensor (e.g., measures changes in temperature to identify movement), a presence sensor, a camera (e.g., to detect user movement), and/or the like.

If the motion sensor 120 is a PIR motion sensor, the motion sensor 120 may be a bi-level dimming PIR sensor used in ceiling mount, high bay, and/or low bay applications. For example, the PIR motion sensor 120 is coupled to a 0-10V driver dimming wire (described below) that couples the PIR motion sensor 120 to the light source 130. When the PIR motion sensor 120 detects motion, the PIR motion sensor 120 can transmit a signal to the light source 130 via the 0-10V driver dimming wire to output light at 100% lumen or light output level. When the PIR motion sensor 120 has not detected motion for a first period of time (e.g., 5 seconds, 5 minutes, 10 minutes, 15 minutes, 30 minutes, etc.), the PIR motion sensor 120 can transmit a signal to the light source 130 to dim the lighting to a specific level (e.g., 25% lumen output, 50% lumen output, 75% lumen output, etc.). When the PIR motion sensor 120 has not detected motion for a second period of time after the first period of time has expired (e.g., 10 seconds, 30 minutes, 45 minutes, 60 minutes, etc.), the PIR motion sensor 120 can transmit a signal to the light source 130 to shut off the light source 130 (e.g., reduce the light output to 0% lumen output). Alternatively, the PIR motion sensor 120 can be configured to never shut off the light source 130 no matter how long the PIR motion sensor 120 has not detected motion after the first period of time has expired. The PIR motion sensor 120 may be structured such that the PIR motion sensor 120 is suitable for a variety of indoor and outdoor applications, including supporting fixture (e.g., light fixture) and/or ceiling mounts (e.g., the PIR motion sensor 120 can be embedded within a fixture and/or ceiling mount).

If the motion sensor 120 is a microwave motion sensor, the motion sensor 120 may be a bi-level dimming microwave sensor that emits microwaves at a certain frequency (e.g., 10.525 GHz) and uses the Doppler shift of the return or reflected waves to detect motion. For example, the microwave motion sensor 120 may implement bi-level dimming as described above with respect to the PIR motion sensor 120. The microwave motion sensor 120 may be structured such that the microwave motion sensor 120 is suitable for a variety of indoor and outdoor applications, including supporting fixture (e.g., light fixture) and/or ceiling mounts (e.g., the microwave motion sensor 120 can be embedded within a fixture and/or ceiling mount).

If the motion sensor 120 is an ultrasonic motion sensor, the motion sensor 120 may be a bi-level dimming ultrasonic sensor that emits a high frequency sound wave (e.g., 40 kHz) and uses the Doppler Effect to detect motion. For example, the ultrasonic motion sensor 120 may implement bi-level dimming as described above with respect to the PIR motion sensor 120. The ultrasonic motion sensor 120 may be structured such that the ultrasonic motion sensor 120 is suitable for a variety of indoor and outdoor applications, including supporting fixture (e.g., light fixture) and/or ceiling mounts (e.g., the ultrasonic motion sensor 120 can be embedded within a fixture and/or ceiling mount).

The motion sensor 120 can have a default setting (e.g., set by a manufacturer or a user). The motion sensor 120 may also include physical components for making physical adjustments to the settings of the motion sensor 120. For example, the motion sensor 120 can include one or more dip switches, trimpots, trimmers, etc. to enable a user to make physical adjustments to the settings of the motion sensor 120 (e.g., physical adjustments to the range of detection of the motion sensor 120, the first period of time, the second period of time, etc.).

The motion sensor 120 can communicate with the light source 130 via wired or wireless communications. For example, a 0-10V driver dimming wire and/or an active high/low wire (also referred to as a motion high/low wire, which produces a motion high signal or a motion low signal, or a control high/low wire, which produces a control high signal or a control low signal) can extend outward from a housing of the motion sensor 120. The motion sensor 120 can output signals along the wire(s) to control the light source 130, as described in greater detail below.

The light source 130 can be any device that generates light. For example, a light source 130 can include a light fixture (e.g., a ceiling light fixture, a chandelier, a fan light fixture, a pendant, a recessed light fixture, a utility light fixture, a wall light fixture, etc.), an incandescent light bulb, a compact fluorescent (CFL) light bulb, a light emitting diode (LED), a linear fluorescent tube, a high intensity discharge (HID) light bulb, and/or the like. The light source 130 can receive control signals from the motion sensor 120 (e.g., via the 0-10V driver dimming and/or active high/low wires) for controlling the operation of the light source 130.

In some embodiments, the motion sensor 120 and the light source 130 are installed within the same structure (e.g., within the same room in a structure). The user device 102, however, may be physically located at any location in which the user device 102 can establish communications with the motion sensor 120 via the network 110. For example, the user device 102 can be physically located in the same room as the motion sensor 120. Alternatively, the user device 102 can be located in a different room than the motion sensor 120 (e.g., but within a distance of the motion sensor 120 such that data packets transmitted by the user device 102 can reach the motion sensor 120 and/or data packets transmitted by the motion sensor 120 can reach the user device 102) or in an entirely different location than the motion sensor 120 (e.g., a different geographic location). In other embodiments, the motion sensor 120 and the light source 130 are not installed within the same structure. For example, the motion sensor 120 may be integrated within an exterior wall of a building and the light sources 130 may be physically located outside the building.

Example Motion Sensor

Figure 2A:
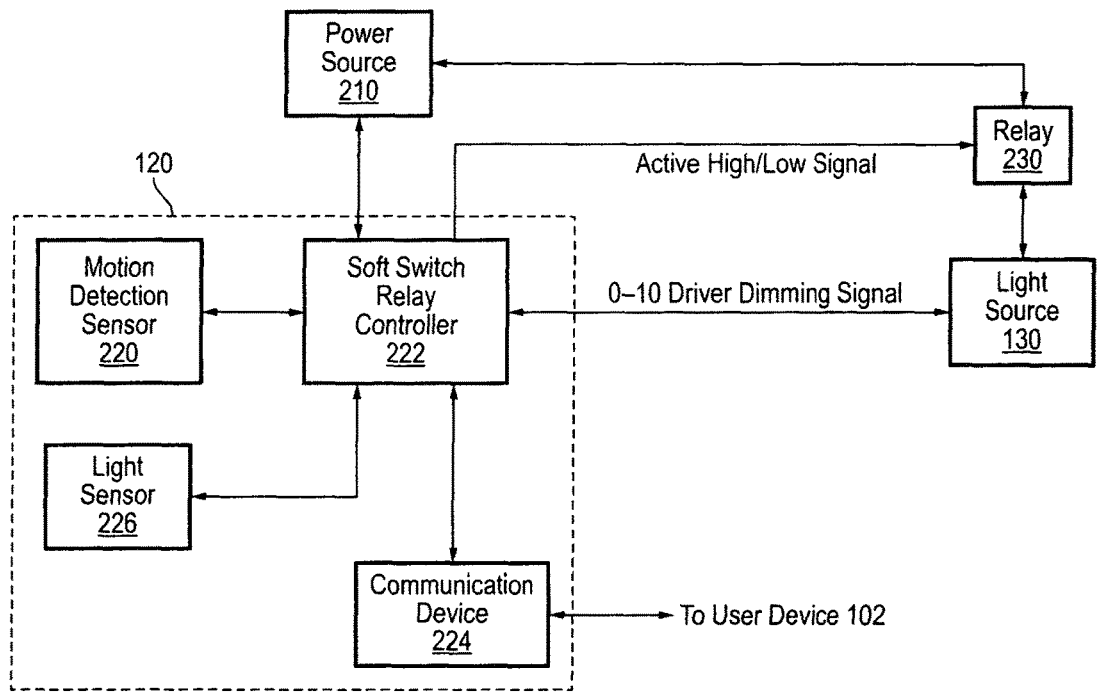
FIG. 2A illustrates a block diagram of the motion sensor and the components coupled to the motion sensor, according to one embodiment.

FIG. 2A illustrates a block diagram of the motion sensor 120 and the components coupled to the motion sensor 120, according to one embodiment. As illustrated in FIG. 2A, the motion sensor 120 is coupled to a power source 210 and the light source 130. In some embodiments, the motion sensor 120 and the light source 130 are also coupled to a relay 230. For example, the power source 210 can provide power to the light source 130 via the relay 230 and/or to the motion sensor 120. The power source 210 can be an electrical grid within a structure, an electrical socket, a renewable energy source (e.g., a solar voltaic cell or group of cells, a wind turbine, a hydroelectric facility, etc.), a battery, a power pack, and/or the like. The relay 230 can be a switch, such as a mechanical switch. Optionally, the relay 230 includes a power metering circuit that outputs power information, such as the operating current, voltage, etc. passing through the relay 230).

The motion sensor 120 can include various physical components. For example, the motion sensor 120 can include a motion detection sensor 220, a soft switch relay controller 222, a communication device 224, and a light sensor 226. The motion sensor PCB may include the motion detection sensor 220, the soft switch relay controller 222, and the light sensor 226 and the communication PCB may include the communication device 224. The communication PCB may be an optional daughter board that can plug in to the motion sensor PCB without any modifications to the components on the motion sensor PCB (e.g., the motion sensor 120 can be used to detect movement even if the communication PCB is removed). The motion detection sensor 220 can be a PIR sensor, a microwave sensor, an ultrasonic sensor, a CMOS sensor, and/or any combination thereof. The motion detection sensor 220 can be configured to detect motion of an object (e.g., a user) and indicate to the soft switch relay controller 222 when motion is detected.

The communication device 224 can be configured to communicate wirelessly with a user device 102 via the network 110 or with another motions sensor 120 via the network 110 (e.g., another motion sensor 120 in the first lighting control environment 100, such as another motion sensor 120 configured to control another light source 130, that is not physically housed within the same enclosure as the present motion sensor 120 and/or that is not physically located at the same location as the present motion sensor 120). The communication device 224 can include an antenna to receive wireless signals from a user device 102 (optionally via a network routing component) and/or other motion sensor 120 and/or to transmit wireless signals to the user device 102 (optionally via a network routing component) and/or other motion sensor 120. The communication device 224 can include a transceiver (e.g., a Bluetooth transceiver, a Wi-Fi transceiver, etc.) and related circuitry to enable the buffering, transmission, and reception of data packets. The communication device 224 can receive soft switching relay instructions for storage and execution, individual instructions for execution, motion sensor setting data, and/or occupancy sensor setting data from the user device 102 and can receive motion detection information from another motion sensor 120. The communication device 224 can process received data packets and transmit relevant information to the soft switch relay controller 222. Such relevant information can include instructions to execute, a value for a motion sensor setting, the user device 102 attempting to access the motion sensor 120, whether another motion sensor 120 detected motion, and/or the like. The communication device 224 can also process information received from the soft switch relay controller 222 (e.g., confirmation that a motion sensor setting is changed, a value of a current motion sensor setting, motion sensor statistics and/or characteristics, whether motion is detected, etc.) and generate data packets for transmission of such information to the user device 102 and/or other motion sensor 120.

The light sensor 226 can be configured to detect a lux level of ambient light present at the physical location of the motion sensor 120. For example, the light sensor 226 can be a photo diode, a photo transistor, and/or the like. The light sensor 226 can transmit the detected lux level to the soft switch relay controller 222 so that the soft switch relay controller 222 can use the detected lux level to determine whether enough ambient light is present to warrant disabling the light source 130. The soft switch relay controller 222 can also use the detected lux level to modify the light output level of the light source 130. For example, while ambient light may be present, the level of ambient light may not be high enough to warrant a complete disabling of the light source 130. Thus, the ambient light can be harvested to augment the light produced by the light source 130. In particular, if the soft switch relay controller 222 determines that the light output level of the light source 130 should be at a first level (e.g., 80%) given the situation (e.g., motion is detected, motion has not been detected for a first period of time, motion has not been detected for a second period of time after the first period of time has passed, etc.), then the soft switch relay controller 222 can lower the light output level from the first level (e.g., 80%) to a second level (e.g., 60%) that is less than the first level by an amount corresponding to the detected lux level (e.g., the detected lux level may be at 200 lux, which may correspond to a light output level of 20%). In practice, the soft switch relay controller 222 may cause the light source 130 to output light at the second level by lowering the voltage output along the 0-10V driver dimming wire (e.g., from 8V to 6V). Thus, the location may still be illuminated at the first level, just that a portion of the light contributing to the first level may be from ambient light rather than the light source 130.

In further embodiments, the light sensor 226 can transmit the detected lux level to the soft switch relay controller 222 so that the soft switch relay controller 222 can use the detected lux level to determine whether a lack of sufficient ambient light warrants the enabling of the light source 130. For example, the motion sensor 120 and/or light fixture 250 (described below) can operate in a night mode, which can be enabled automatically (e.g., at preset times) and/or manually by a user via the application running on the user device 102. If the night mode is enabled, the motion detection sensor 220 can indicate to the soft switch relay controller 222 that motion is detected, and the light sensor 226 can indicate to the soft switch relay controller 222 that the detected lux level is below a threshold value (e.g., a lux level indicating darkness or near darkness, such as 10.8 lux, 1.08 lux, 0.108 lux, 0.0108 lux, 0.0011 lux, 0.0001 lux, etc.), then the soft switch relay controller 222 can cause the light source 130 to output light at a relatively low light output level (e.g., 5%, 10%, 15%, etc. or any suitable level that is lower than a typical light output level for a lux condition above the threshold value). This may be beneficial in situations in which an occupant is getting out of bed at night or is otherwise entering a dark space. In certain applications, by configuring the soft switch relay controller 222 to cause the light source 130 to output light at a low light output level, the occupant may not suffer the immediate brightness of full light output, other occupants in the room who may be sleeping may not be awakened, and the occupant may be able to safely navigate the space and return to bed without the night vision rhodopsin being bleached from the occupant's eyes.

The soft switch relay controller 222 can use information received from the motion detection sensor 220, the communication device 224, and the light sensor 226 to determine whether the light source 130 should be enabled and, if so, the amount of light that the light source 130 should output. The techniques implemented by the soft switch relay controller 222 to make these determinations are described in greater detail below with respect to FIG. 5. If the soft switch relay controller 222 determines that the light source 130 should be enabled and/or should be enabled at a specific dim level, then the soft switch relay controller 222 can cause the light source 130 to output light at the determined levels via the 0-10V driver dimming wire.

For example, the soft switch relay controller 222 can output a 0-10V driver dimming signal via the 0-10V driver dimming wire in which a voltage of the dimming signal is lowered such that a current passing through the relay 230 is at a minimum level (e.g., 0, 1% of normal operating current, 10% of normal operating current, etc.). Thus, the light source 130 may be dimmed if the light source 130 is already enabled. If the relay 230 includes a power metering circuit, the soft switch relay controller 222 can poll the relay 230 to determine when the current has reached the minimum level. Alternatively, if the relay 230 does not include the power metering circuit, the soft switch relay controller 222 can wait a threshold period of time (e.g., 300 ms). Once the soft switch relay controller 222 receives an indication that the current has reached a minimum level or the threshold period of time has expired, then the soft switch relay controller 222 can output an active high/low signal via the active high/low wire. Specifically, the soft switch relay controller 222 may output an active high signal (e.g., a logical "1"), which enables the relay 230 such that electrical current flows between the power source 210 and the light source 130 (e.g., to provide power to the light source 130). After the relay 230 contacts are stable or no longer moving (e.g., the switching is complete, as optionally indicated by the relay 230) or after a threshold period of time (e.g., 300 ms) from when the active high signal is outputted expires, then the soft switch relay controller can output a second 0-10V driver dimming signal via the 0-10V driver dimming wire, where the second 0-10V driver dimming signal specifies the light output level of the light source 130. As described herein, the light output level can range from 0% or 0V (e.g., the light source 130 produces no light) to 100% or 10V (e.g., the light source 130 produces a maximum amount of light allowed by its components).

If the soft switch relay controller 222 determines that the light source 130 should be shut off, then the soft switch relay controller 222 can output a 0-10V driver dimming signal via the 0-10V driver dimming wire in which a voltage of the dimming signal is lowered such that a current passing through the relay 230 is at a minimum level (e.g., 0, 1% of normal operating current, 10% of normal operating current, etc.). Thus, the light source 130 may be dimmed if the light source 130 is already enabled. If the relay 230 includes a power metering circuit, the soft switch relay controller 222 can poll the relay 230 to determine when the current has reached the minimum level. Alternatively, if the relay 230 does not include the power metering circuit, the soft switch relay controller 222 can wait a threshold period of time (e.g., 300 ms). Once the soft switch relay controller 222 receives an indication that the current has reached a minimum level or the threshold period of time has expired, then the soft switch relay controller 222 can output an active high/low signal via the active high/low wire. Specifically, the soft switch relay controller 222 may output an active low signal (e.g., a logical "0"), which disables the relay 230 such that no electrical current flows between the power source 210 and the light source 130 (and thus the light source 130 produces no light). After the relay 230 contacts are stable or no longer moving (e.g., the switching is complete, as optionally indicated by the relay 230) or after a threshold period of time (e.g., 300 ms) from when the active high signal is outputted expires, then the soft switch relay controller can maintain the voltage of the outputted 0-10V driver dimming signal (e.g., such that the current passing through the relay 230 remains at a minimum level) and/or further reduce the voltage of the dimming signal (e.g., to 0V) such that no light is output by the light source 130.

Figure 2B:
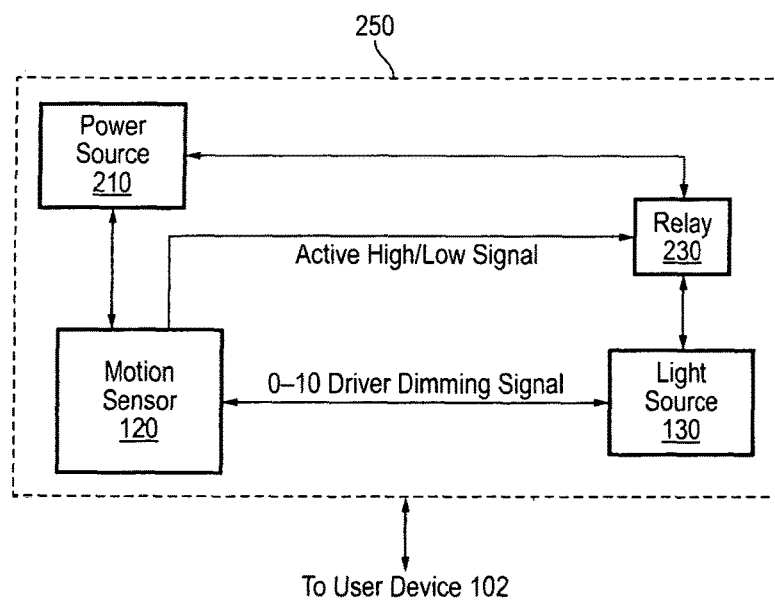
FIG. 2B illustrates a block diagram of the light fixture or luminaire that includes an integrated motion sensor, according to one embodiment.

FIG. 2B illustrates a block diagram of the light fixture or luminaire 250 that includes an integrated motion sensor 120, according to one embodiment. As illustrated in FIG. 2B, the light fixture 250 includes the motion sensor 120, the light source 130, the power source 210, and the relay 230. For example, the light fixture 250 may include a housing that encloses the motion sensor 120, the light source 130, the power source 210, and/or the relay 230. The light fixture 250 may be mounted, coupled, or attached to a ceiling, wall, or other like feature of a building or similar structure.

While FIG. 2B illustrates the power source 210 and the relay 230 as being included within the light fixture 250, the power source 210 and/or the relay 230 can be external to the light fixture 250 in some embodiments.

Figure 2C:
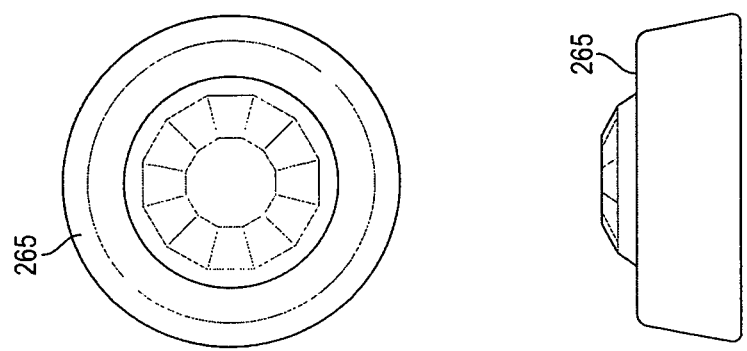
FIG. 2C illustrates an example schematic and diagram of a PIR motion sensor, according to one embodiment.
Figure 2C:
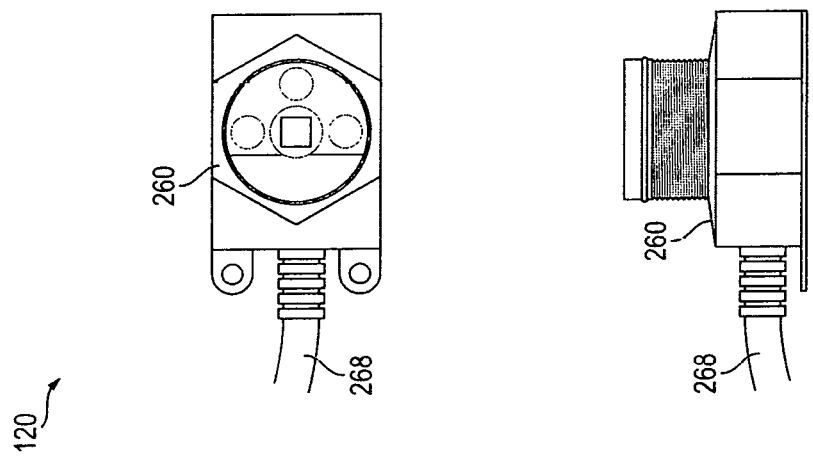

FIG. 2C illustrates an example schematic and diagram of a PIR motion sensor 120. As illustrated in FIG. 2C, the PIR motion sensor 120 includes a housing 260 that encloses the motion detection sensor 220, the soft switch relay controller 222, the communication device 224 and the light sensor 226. The housing 260 of the PIR motion sensor 120 may optionally be enclosed within a lens cover 265. Cable 268 extending from the housing 260 may include the active/high low wire and/or the 0-10V driver dimming wire. While FIG. 2C illustrates dimensions of the PIR motion sensor 120, this is merely for illustrative purposes. The PIR motion sensor 120 can be constructed to be smaller or larger than depicted.

Figure 2D:
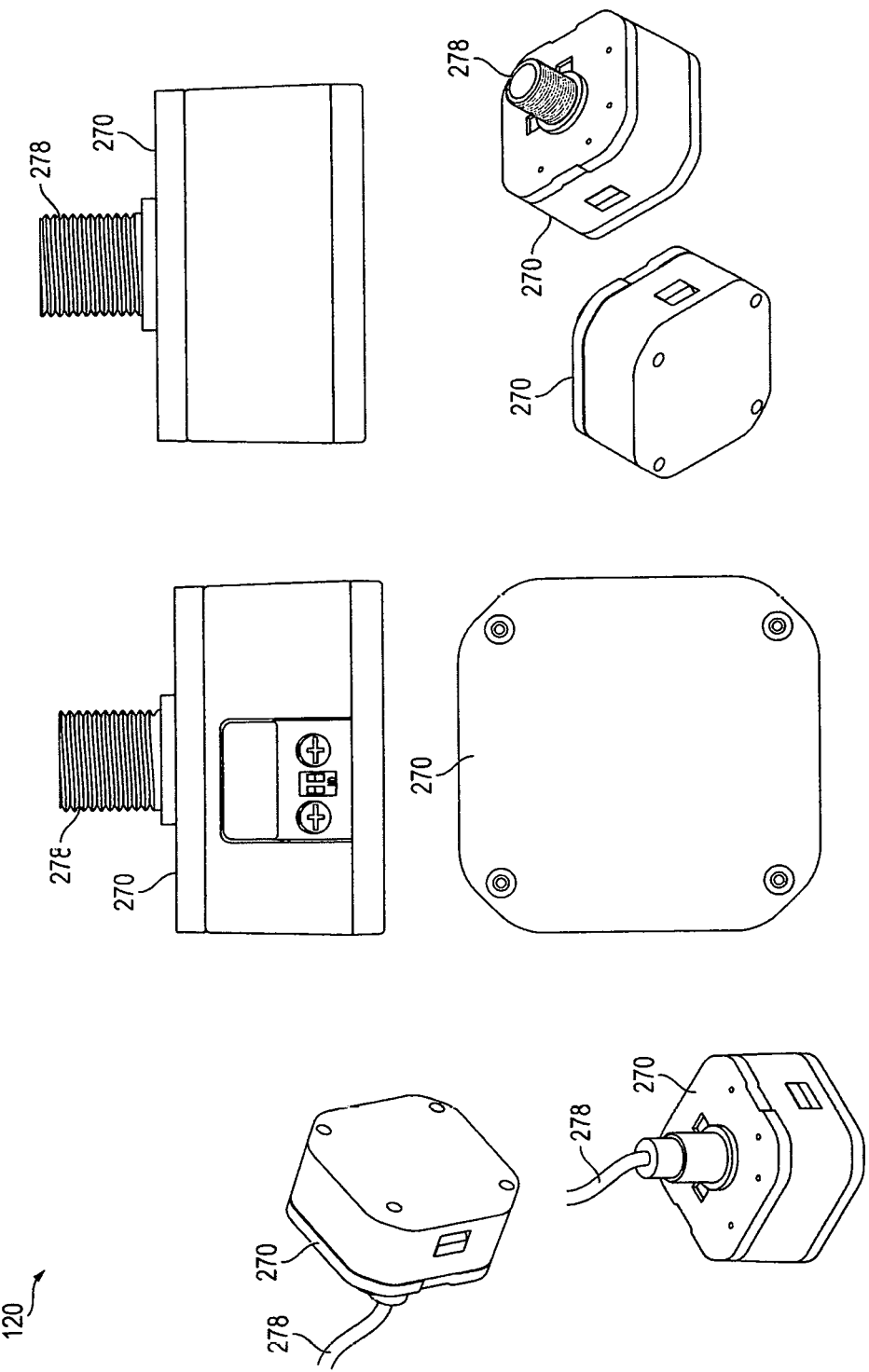
FIG. 2D illustrates an example schematic and diagram of a microwave motion sensor, according to one embodiment.

FIG. 2D illustrates an example schematic and diagram of a microwave motion sensor 120. As illustrated in FIG. 2D, the microwave motion sensor 120 includes a housing 270 that encloses the motion detection sensor 220, the soft switch relay controller 222, the communication device 224 and the light sensor 226. Cable 278 extending from the housing 270 may include the active/high low wire and/or the 0-10V driver dimming wire. While FIG. 2D illustrates dimensions of the microwave motion sensor 120, this is merely for illustrative purposes. The microwave motion sensor 120 can be constructed to be smaller or larger than depicted.

FIG. 2E illustrates an example schematic and diagram of an ultrasonic motion sensor 120. As illustrated in FIG. 2E, the ultrasonic motion sensor 120 includes a housing 280 that encloses the motion detection sensor 220, the soft switch relay controller 222, the communication device 224 and the light sensor 226. Cable 288 extending from the housing 280 may include the active/high low wire and/or the 0-10V driver dimming wire. While FIG. 2E illustrates dimensions of the ultrasonic motion sensor 120, this is merely for illustrative purposes. The ultrasonic motion sensor 120 can be constructed to be smaller or larger than depicted.

System Components with a Power Pack

Figure 3A:
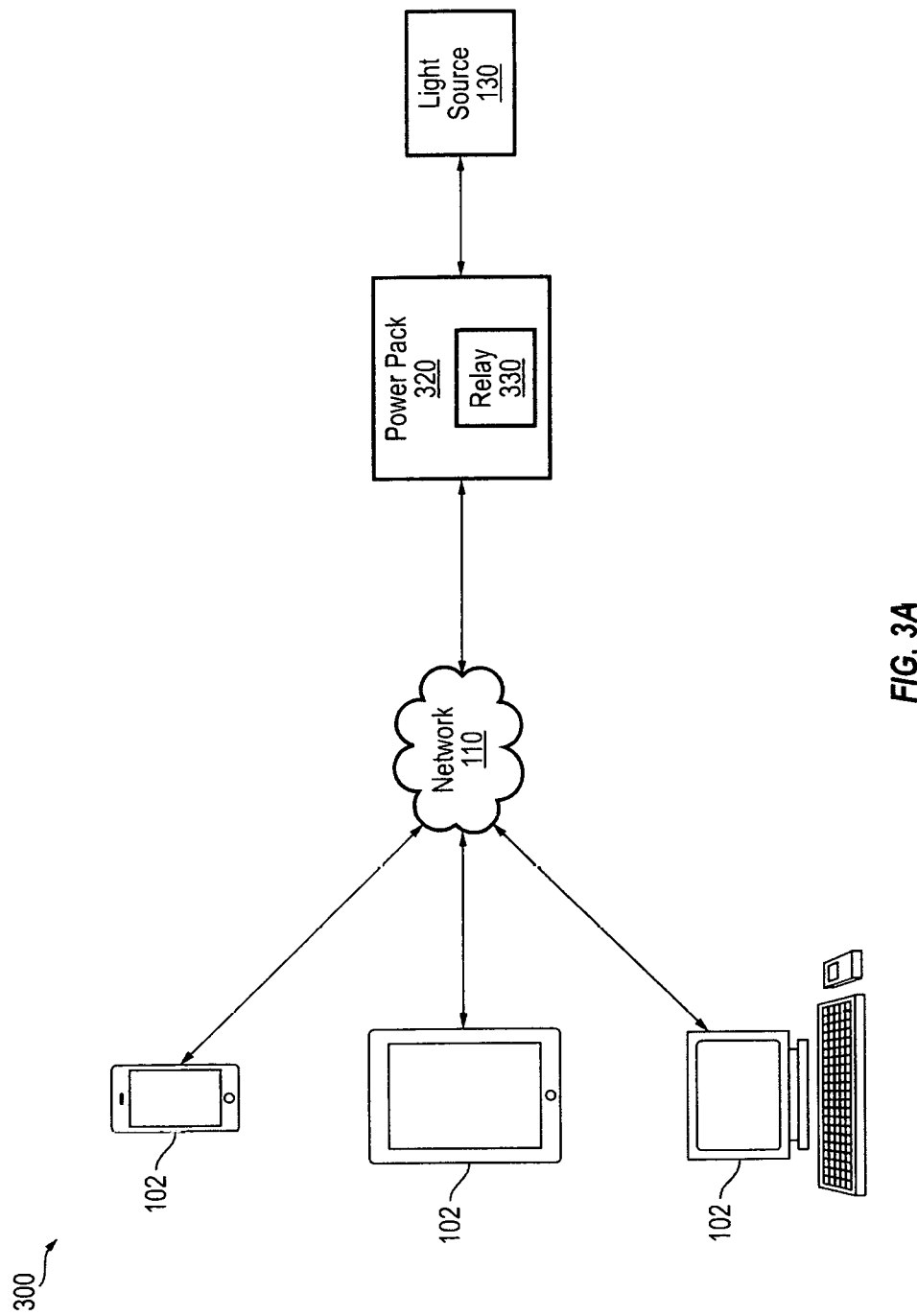
FIG. 3A illustrates a second lighting control environment that includes a power pack that controls a light source, according to one embodiment

FIG. 3A illustrates a second lighting control environment 300 that includes a power pack 320 that controls a light source 130, according to one embodiment. The second lighting control environment 300 shown in FIG. 3A is similar to the first lighting control environment 100 shown in FIG. 1. However, unlike in the first lighting control environment 100, the second lighting control environment 300 includes a power pack 320 instead of the motion sensor 120. The second lighting control environment 300 may include any suitable number of distinct user devices 102, power packs 320, and/or light sources 130.

The power pack 320 functions to step down a line voltage (e.g., 120V to 277V) to a voltage desired by a motion sensor or the light source 130 (e.g., 12V to 24V), where the power pack includes a relay 330 used to control whether the light source 130 receives power. The power pack 320 is further in communication with the light source 130 via the 0-10V driver dimming wire. The power pack 320 can receive an instruction to turn on or off the light source 130 (e.g., from a motion sensor, from the user device 102, from a mechanical switch, etc.). In response to receiving the instruction, the power pack 320 can dim the light source 130 (e.g., via a 0-10V driver dimming wire), open or close the relay 330, and either un-dim the light source 130 (e.g., if the light source 130 is to be turned on) or maintain the dimming of the light source 130 (e.g., if the light source 130 is to be turned off) in a manner as described above with respect to the soft switch relay controller 222.

The power pack 320 can receive one or more instructions (e.g., from the user device 102) that direct the power pack 320 to dim the light source 130 (e.g., via a 0-10V driver dimming wire), open or close the relay 330, and/or either un-dim the light source 130 (e.g., if the light source 130 is to be turned on) or maintain the dimming of the light source 130 (e.g., if the light source 130 is to be turned off) in a manner as described above with respect to the soft switch relay controller 222. The instructions can be received at a time that the corresponding operations are to occur. Thus, the power pack 320 may execute a received instruction upon reception. In other embodiments, the instructions can be received before a time that the corresponding operations are to occur. Thus, the power pack 320 may execute a received instruction at a later time (e.g., when a message is received to turn on or off the source 130, according to a schedule stored locally in memory of the power pack 320 of when the light source 130 is enabled and disabled, etc.).

Figure 3B:
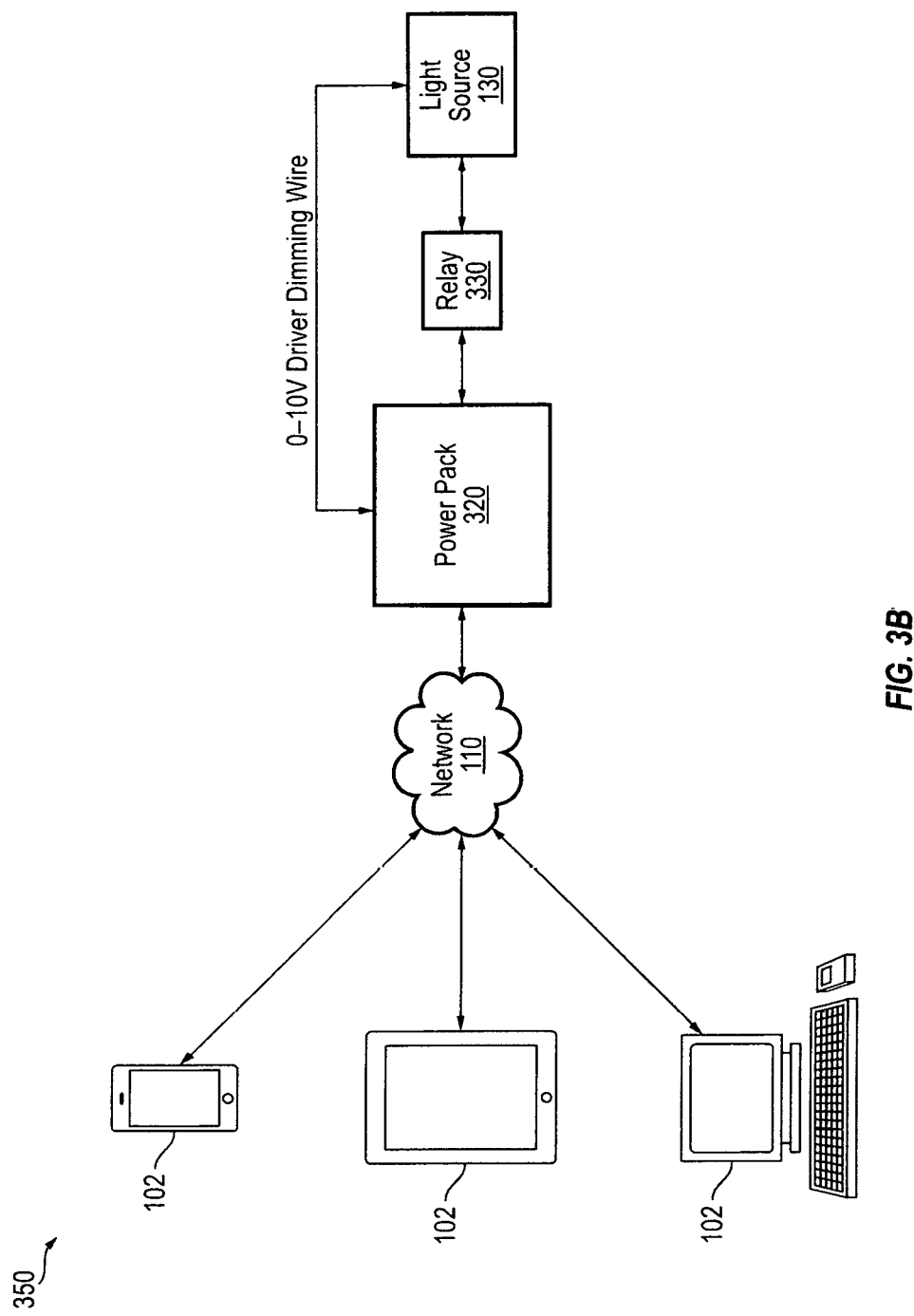
FIG. 3B illustrates a third lighting control environment that includes the power pack that controls the light source and an external relay, according to one embodiment

FIG. 3B illustrates a third lighting control environment 350 that includes the power pack 320 that controls the light source 130 and an external relay 330, according to one embodiment. The third lighting control environment 350 shown in FIG. 3B is similar to the second lighting control environment 300 shown in FIG. 3A. However, unlike in the second lighting control environment 300, the relay 330 is external to the power pack 320 in the third lighting control environment 350.

The power pack 320 is in communication with the light source 130 via the 0-10V driver dimming wire and is in communication with the relay 330 via the active high/low wire. The power pack 320 further supplies power to the light source 130 via the relay 330. The power pack 320 can receive an instruction to turn on or off the light source 130 (e.g., from a motion sensor, from the user device 102, from a mechanical switch, etc.). In response to receiving the instruction, the power pack 320 can dim the light source 130 (e.g., via the 0-10V driver dimming wire), open or close the relay 330 (e.g., via the active high/low wire), and either un-dim the light source 130 (e.g., if the light source 130 is to be turned on) or maintain the dimming of the light source 130 (e.g., if the light source 130 is to be turned off) in a manner as described above with respect to the soft switch relay controller 222.

The power pack 320 can receive one or more instructions (e.g., from the user device 102) that direct the power pack 320 to dim the light source 130 (e.g., via the 0-10V driver dimming wire), open or close the relay 330 (e.g., via the active high/low wire), and/or either un-dim the light source 130 (e.g., if the light source 130 is to be turned on) or maintain the dimming of the light source 130 (e.g., if the light source 130 is to be turned off) in a manner as described above with respect to the soft switch relay controller 222. The instructions can be received at a time that the corresponding operations are to occur. Thus, the power pack 320 may execute a received instruction upon reception. In other embodiments, the instructions can be received before a time that the corresponding operations are to occur. Thus, the power pack 320 may execute a received instruction at a later time (e.g., when a message is received to turn on or off the source 130, according to a schedule stored locally in memory of the power pack 320 of when the light source 130 is enabled and disabled, etc.).

System Components with a Controller

Figure 4:
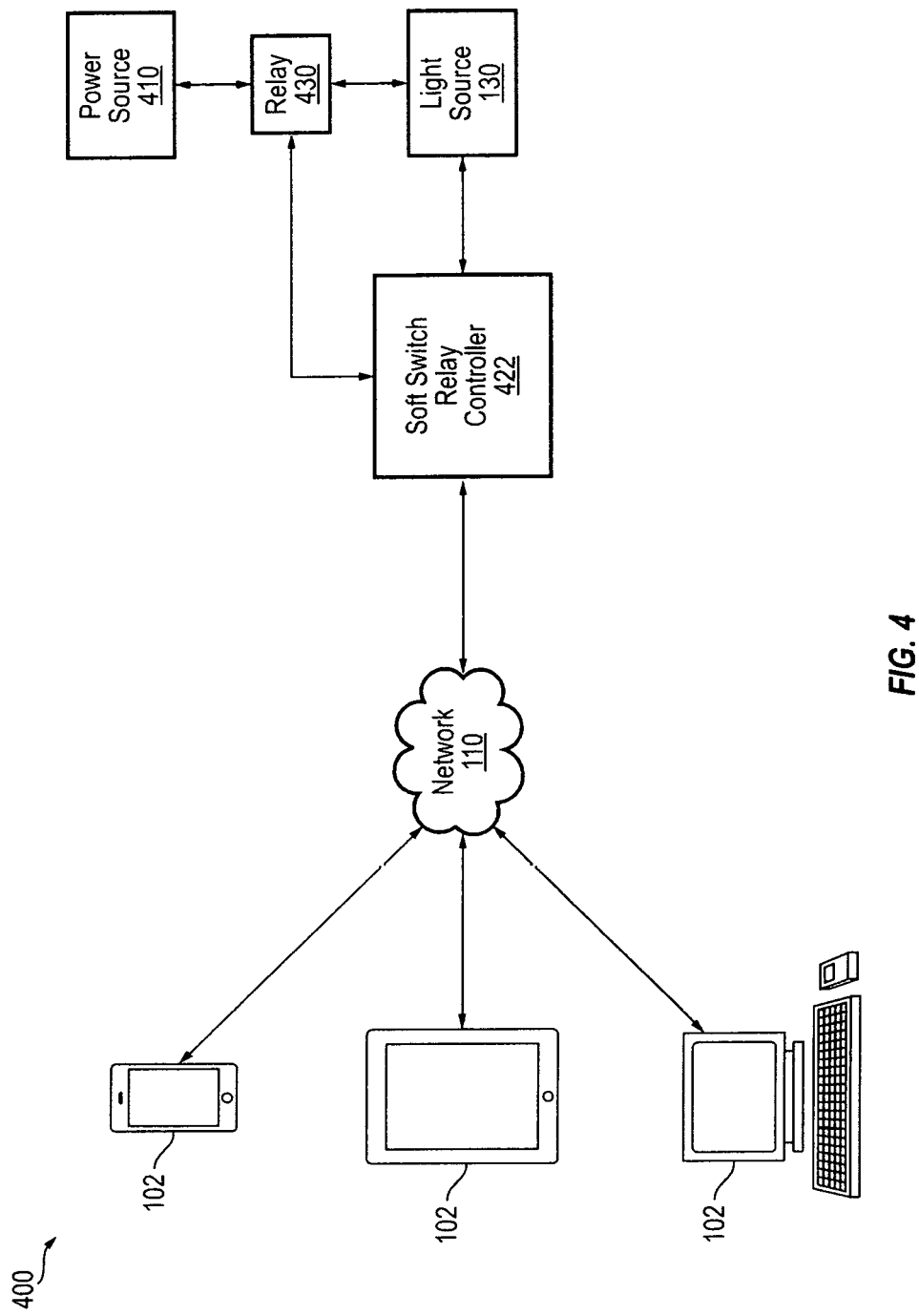
FIG. 4 illustrates a fourth lighting control environment that includes a soft switch relay controller that controls a light source, according to one embodiment

FIG. 4 illustrates a fourth lighting control environment 400 that includes a soft switch relay controller 422 that controls a light source 130, according to one embodiment. The fourth lighting control environment 400 shown in FIG. 4 is similar to the first lighting control environment 100 shown in FIG. 1. However, unlike in the first lighting control environment 100, the fourth lighting control environment 400 includes the soft switch relay controller 422 instead of the motion sensor 120. The fourth lighting control environment 400 further includes a power source 410, a relay 430, and the light source 130. The fourth lighting control environment 400 may include any suitable number of distinct user devices 102, soft switch relay controllers 422, power sources 410, relays 430, and/or light sources 130.

The soft switch relay controller 422 is in communication with the light source 130 via the 0-10V driver dimming wire and is in communication with the relay 430 via the active high/low wire. The relay 430 controls whether the light source 130 receives power from the power source 410. The soft switch relay controller 422 can receive an instruction to turn on or off the light source 130 (e.g., from a motion sensor, from the user device 102, from a mechanical switch, etc.). In response to receiving the instruction, the soft switch relay controller 422 can dim the light source 130 (e.g., via the 0-10V driver dimming wire), open or close the relay 430 (e.g., via the active high/low wire), and either un-dim the light source 130 (e.g., if the light source 130 is to be turned on) or maintain the dimming of the light source 130 (e.g., if the light source 130 is to be turned off) in a manner as described above with respect to the soft switch relay controller 222.

The soft switch relay controller 422 can receive one or more instructions (e.g., from the user device 102) that direct the power pack 320 to dim the light source 130 (e.g., via the 0-10V driver dimming wire), open or close the relay 430 (e.g., via the active high/low wire), and/or either un-dim the light source 130 (e.g., if the light source 130 is to be turned on) or maintain the dimming of the light source 130 (e.g., if the light source 130 is to be turned off) in a manner as described above with respect to the soft switch relay controller 222. The instructions can be received at a time that the corresponding operations are to occur. Thus, the soft switch relay controller 422 may execute a received instruction upon reception. In other embodiments, the instructions can be received before a time that the corresponding operations are to occur. Thus, the soft switch relay controller 422 may execute a received instruction at a later time (e.g., when a message is received to turn on or off the source 130, according to a schedule stored locally in memory of the soft switch relay controller 422 of when the light source 130 is enabled and disabled, etc.).

Example Process for Controlling Operation of a Light Source

Figure 5:
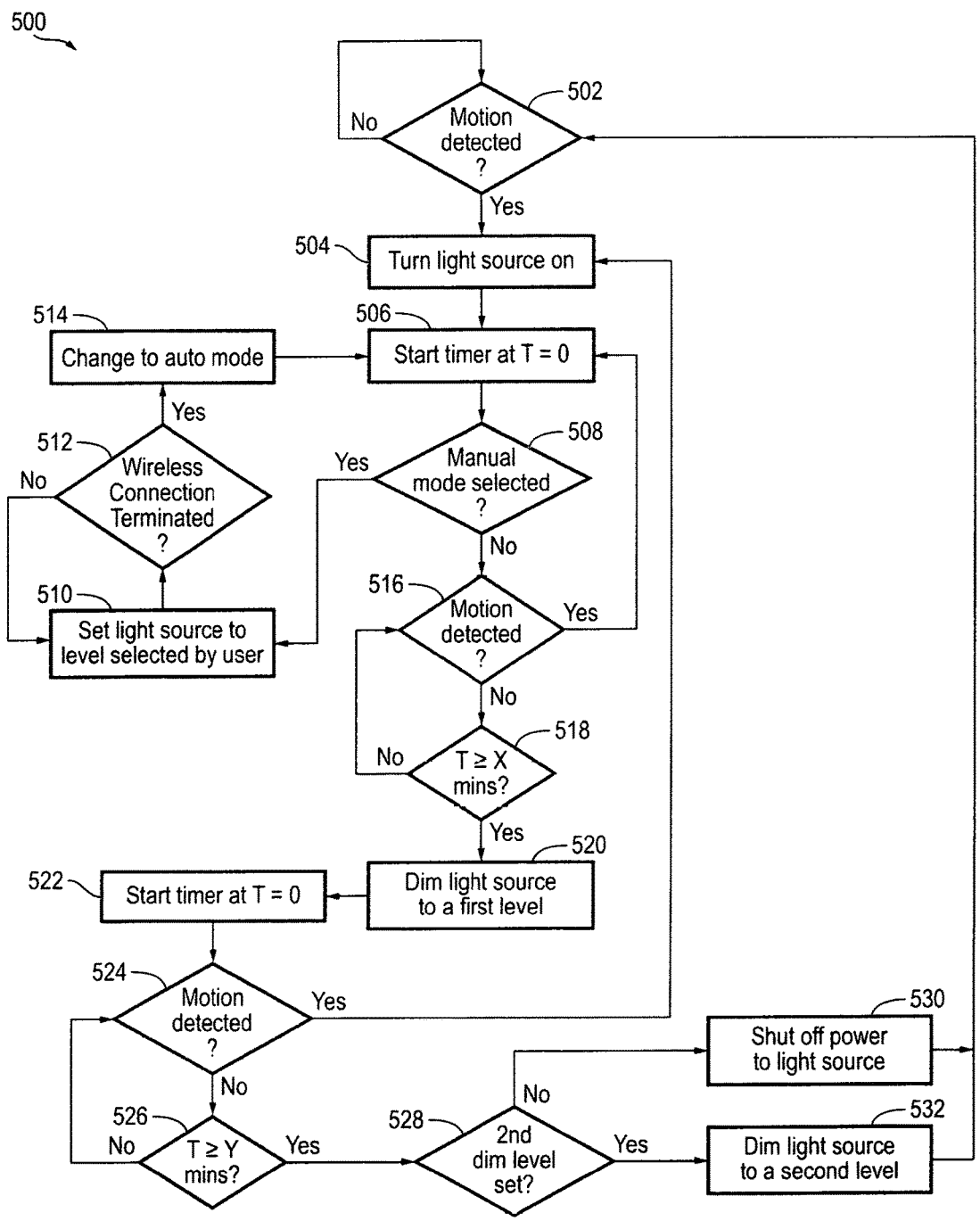
FIG. 5 illustrates an example process for controlling operation of the light source, according to one embodiment.

FIG. 5 illustrates an example process 500 for controlling operation of the light source 130, according to one embodiment. Any suitable firmware and/or electronic hardware can perform the process 500. For example, the motion sensor 120 of FIG. 1 (e.g., the soft switch relay controller 222 of FIG. 2A), the power pack 320 of FIGS. 3A-3B, and/or the soft switch relay controller 422 of FIG. 4 can be configured to execute the process 500, for example. The process 500 begins at block 502.

At block 502, a determination is made as to whether motion is detected or a control signal is received to turn on the light source 130 (e.g., from a mechanical switch, a user device 102, etc.). For example, the soft switch relay controller 222 may receive a message from the motion detection sensor 220 if motion of an object is detected. If no motion is detected and no control signal is received, the process 500 returns to block 502. Otherwise, the process 500 proceeds to block 504.

At block 504, a light source is turned on. The process 500 may run process 600 described below with respect to FIG. 6 to turn on the light source. For example, the soft switch relay controller 222 can turn the light source 130 on by first reducing a voltage on the 0-10V driver dimming wire (e.g., such that the current passing through the relay 230 reaches a minimum level). The soft switch relay controller 222 can then send an active high signal to the relay 230 (e.g., if the soft switch relay controller 222 had previously sent an active low signal to the relay 230) after a threshold period of time passes and/or after the soft switch relay controller 222 receives an indication from a power metering circuit of the relay 230 that the current passing through the relay 230 has reached the minimum level. Then, the soft switch relay controller 222 can increase a voltage along the 0-10V driver dimming wire to exceed a threshold value (e.g., exceed 1V, where a voltage between 0V and 1V results in the light source 130 not outputting any light) and that corresponds with a desired light output level (e.g., 10V if 100% light output is desired and/or set by the user via the user device 102) alter a threshold period of time passes or after the soft switch relay controller 222 receives an indication from the relay 230 that the relay contacts are stable. The process 500 then proceeds to block 506.

In additional embodiments, not shown in FIG. 5, the light source 130 is not turned on in response to detecting motion. Rather, the soft switch relay controller 222 may analyze the lux level of the ambient light measured by the light sensor 226. If the lux level exceeds a threshold value (e.g., specified by the user via the application running on the user device 102), then the process 500 does not proceed to block 504 (e.g., the light source 130 is not turned on because there is enough ambient light present in the area surrounding the motion sensor 120) and the process 500 reverts back to block 502 (e.g., if the process 500 was previously at block 502) or proceeds to block 526 (e.g., if the process 500 was previously at block 524). If the lux level does not exceed a threshold value, then the process 500 can proceed to block 504 as described herein (e.g., the light source 130 is turned on because there is not enough ambient light present in the area surrounding the motion sensor 120). As described above, if the lux level does not exceed the threshold value and a night mode is enabled, then the light source 130 may be turned on at a low light output level (e.g., 5%, 10%, 15%, etc.). Otherwise, if the night mode is not enabled, the light source 130 may be turned on at a default light output level (e.g., 80%, 100%, etc.).

In an embodiment, not shown in FIG. 5, the light source 130 is turned on by the soft switch relay controller 222 in response to motion being detected by the motion detection sensor 220 of the present motion sensor 120 and in response to motion being detected by a motion detection sensor 220 of another motion sensor 120 (e.g., another motion sensor 120 that communicates with the present motion sensor 120 via the network 110 and that is not physically housed within the same enclosure as the present motion sensor 120 and/or that is not physically located at the same location as the present motion sensor 120). If the other motion sensor 120 transmits a signal to the communication device 224 of the present motion sensor 120 indicating that the other motion sensor 120 detected motion, then the process 500 can proceed to block 504 (e.g., because now both the present motion sensor 120 and the other motion sensor 120 have detected motion). If, however, the other motion sensor 120 transmits a signal to the communication device 224 of the present motion sensor 120 indicating that no motion is detected by the other motion sensor 120 or no signal is received from the other motion sensor 120 (e.g., indicating that motion is not detected), then the process 500 reverts back to block 502 (e.g., if the process 500 was previously at block 502) or proceeds to block 526 (e.g., if the process 500 was previously at block 524). Thus, the light source 130 is turned on in response to the current motion sensor 120 detecting motion (or occupancy) and another motion sensor 120 in networked communication with the present motion sensor 120 also detecting motion (or occupancy). By relying on two motion sensors 120 detecting motion (or occupancy) before the light source 130 is turned on, false positives may be avoided. This embodiment can be combined with the embodiment disclosed in the previous paragraph (e.g., that a light source is not turned on if there is enough ambient light present in the area surrounding the motion sensor 120) and/or any other embodiments discussed herein.

In some applications, the light source 130 can be turned on by the soft switch relay controller 222 in response to motion being detected by the motion detection sensor 220 of the present motion sensor 120 or in response to motion being detected by a motion detection sensor 220 of another motion sensor 120. If the other motion sensor 120 transmits a signal to the communication device 224 of the present motion sensor 120 indicating that the other motion sensor 120 detected motion and the process 500 would otherwise remain at block 502 or proceed to block 526 because the present motion sensor 120 has not detected any motion, then the process 500 instead proceeds to block 504 (e.g., because now at least one motion sensor 120 has detected motion). The process 500 also proceeds to block 504 if the present motion sensor 120 detects motion (e.g., at block 502 or block 524) regardless of whether the other motion sensor 120 detects motion. If, however, the other motion sensor 120 transmits a signal to the communication device 224 of the present motion sensor 120 indicating that no motion is detected by the other motion sensor 120 or no signal is received from the other motion sensor 120 (e.g., indicating that motion is not detected) and the process 500 would otherwise remain at block 502 or proceed to block 526 because the present motion sensor 120 has not detected any motion, then the process 500 reverts back to block 502 (e.g., if the process 500 was previously at block 502) or proceeds to block 526 (e.g., if the process 500 was previously at block 524). Thus, the light source 130 may be turned on if at least one of two (or more) motion sensors 120 detects motion (or occupancy). This embodiment can be combined with the embodiment disclosed above in which a light source is not turned on if there is enough ambient light present in the area surrounding the motion sensor 120 and/or any other embodiments discussed herein.

Referring to FIG. 5, at block 506, a timer is started at a reference point, such as at T equals 0. For example, the soft switch relay controller 222 can implement a timer (e.g., using registers or counters) that tracks an amount of time that has elapsed since the timer was started (e.g., referred to as the first period of time herein). The process 500 then proceeds to block 508.

At block 508, a determination is made as to whether a manual mode is selected. For example, the motion sensor 120 may operate under two possible modes: a manual mode and an automatic mode. The motion sensor 120 can operate under the manual mode when the user via the application running on the user device 102 bypasses a default operation of the motion sensor 120 and selects a current light output level of the light source 130 (e.g., indirectly controls the operation of the light source 130 via the motion sensor 120). In the manual mode, the motion sensor 120 still controls the operation of the light source 130 as described herein (e.g., via the 0-10V driver dimming or the active high/low wires). However, the user is provided with controls to manipulate (e.g., directly manipulate) the operation of the light source 130, such as dimming and turning on/off the light source 130. The motion sensor 120 can operate under the automatic mode when the user has not bypassed the default operation of the motion sensor 120 (e.g., where the automatic mode or default operation of the motion sensor 120 is represented by blocks 502, 504, 506, 516, 518, 520, 522, 524, 526, and 528). If the manual mode is selected, the process 500 proceeds to block 510. Otherwise, the process 500 proceeds to block 516.

At block 510, the output of the light source 130 is set to a level selected by the user via the application running on the user device 102. For example, when motion is detected, the motion sensor 120 may turn the light source 130 on at a 100% light output level. The user may find the light to be too bright, and thus may dim the light source 130 to an acceptable light output level (e.g., 80%) via the application. The process 500 then proceeds to block 512.

At block 512, a determination is made as to whether a wireless connection with the user device 102 is terminated. For example, the user via the application running on the user device 102 can manually adjust the light output level of the light source 130. However, the user, while carrying the user device 102, may step away from the motion sensor 120 by a distance that exceeds the transmission range of the user device 102 and/or the motion sensor 120. Thus, a wireless connection between the user device 102 and the motion sensor 120 may be terminated or disconnected. Upon this termination or disconnection, the light source 130 may revert back to the automatic mode (e.g., a default operation) given that the user is likely no longer present near the motion sensor 120 and/or the light source 130. Similarly, the user may terminate a connection with the motion sensor 120 because the user may no longer wish to control the light source(s) 130 coupled to the motion sensor 120. In additional embodiments, not shown, the motion sensor 120 may revert back to the automatic mode if no motion is detected within a threshold amount of time, even if the wireless connection has not been terminated or disconnected. If the wireless connection is terminated or disconnected, then the process 500 proceeds to block 514. Otherwise, the process 500 reverts back to block 510.

At block 514, the motion sensor 120 is changed back to automatic mode. In some embodiments, the light output levels set by the user remain until the process 500 reaches another block that changes the light output levels (e.g., the process 500 proceeds to block 506). In some other embodiments, not shown, the light output levels revert back to light output levels associated with block 504 (e.g., the process 500 proceeds to block 504).

At block 516, a determination is made as to whether motion is detected or a control signal is received to turn on the light source 130 (e.g., from a mechanical switch, a user device 102, etc.). If no motion is detected or no control signal is received, the process 500 proceeds to block 518. Otherwise, the process 500 reverts back to block 506 (e.g., the timer is reset). In additional embodiments, not shown, the process 500 further includes analyzing the lux level of the ambient light measured by the light sensor 226 and/or determining whether another motion sensor 120 has detected motion in a manner as described above before the process 500 proceeds to block 518 (e.g., there is enough ambient light present in the area surrounding the motion sensor 120, the other motion sensor 120 has not detected motion, etc.) or reverts to block 506 (e.g., there is not enough ambient light present in the area surrounding the motion sensor 120, the other motion sensor 120 has detected motion, etc.).

At block 518, a determination is made as to whether T exceeds a threshold length of time represented as X minutes (e.g., where X corresponds to a length of time associated with the first period of time described herein). If T exceeds X (e.g., the first period of time has passed), then the process 500 proceeds to block 520. Otherwise, the process 500 reverts back to block 516.

At block 520, the light source 130 is dimmed to a first level. The light source 130 may be dimmed because no motion has been detected for a first period of time. For example, the first level may be selected by the user via the application running on the user device 102. Generally, the first level may be less than the light output level associated with block 504 to reduce energy consumption. The process 500 then proceeds to block 522.

At block 522, a timer is started at a reference point, such as at T equals 0. For example, the soft switch relay controller 222 can implement a timer (e.g., using registers or counters) that tracks an amount of time that has elapsed since the timer was started (referred to as the second period of time herein). The process 500 then proceeds to block 524.

At block 524, a determination is made as to whether motion is detected or a control signal is received to turn on the light source 130 (e.g., from a mechanical switch, a user device 102, etc.). If no motion is detected or no control signal is received, the process 500 proceeds to block 526. Otherwise, the process 500 reverts back to block 504 (and the light source 130 thus changes from outputting light at the first level to outputting light at the light output level associated with block 504).

At block 526, a determination is made as to whether T exceeds a threshold length of time represented as Y minutes (e.g., where Y corresponds to a length of time associated with the second period of time described herein, and where Y can equal X). If T exceeds Y (e.g., the second period of time has passed), then the process 500 proceeds to block 528. Otherwise, the process 500 reverts back to block 524.

At block 528, a determination is made as to whether a second dim level is set. If a second dim level is set, then the process 500 proceeds to block 532. Otherwise, if a second dim level is not set, then the process 500 proceeds to block 530.

At block 530, power to the light source 130 is shut off. The process 500 may run process 600 described below with respect to FIG. 6 to turn off the light source. For example, the light source 130 may be shut off because no motion has been detected continuously for the first period of time and for a second period of time after the first period of time passed or no control signal is received for the first period of time and for a second period of time after the first period of time passed. The process 500 then proceeds to block 502 and the process 500 is repeated.

At block 532, the light source 130 is dimmed to a second level. The light source 130 may be dimmed again because no motion has been detected continuously for the first period of time and for a second period of time after the first period of time passed or no control signal is received for the first period of time and for a second period of time after the first period of time passed. For example, the second level may be selected by the user via the application running on the user device 102 (and can be 0%, which would cause the light source 130 to be shut off). Generally, the second level may be less than the light output level associated with block 504 and the first level to reduce energy waste. The process 500 then proceeds to block 502 and the process 500 is repeated.

Example Process for Turning On or Off a Light Source

Figure 6:
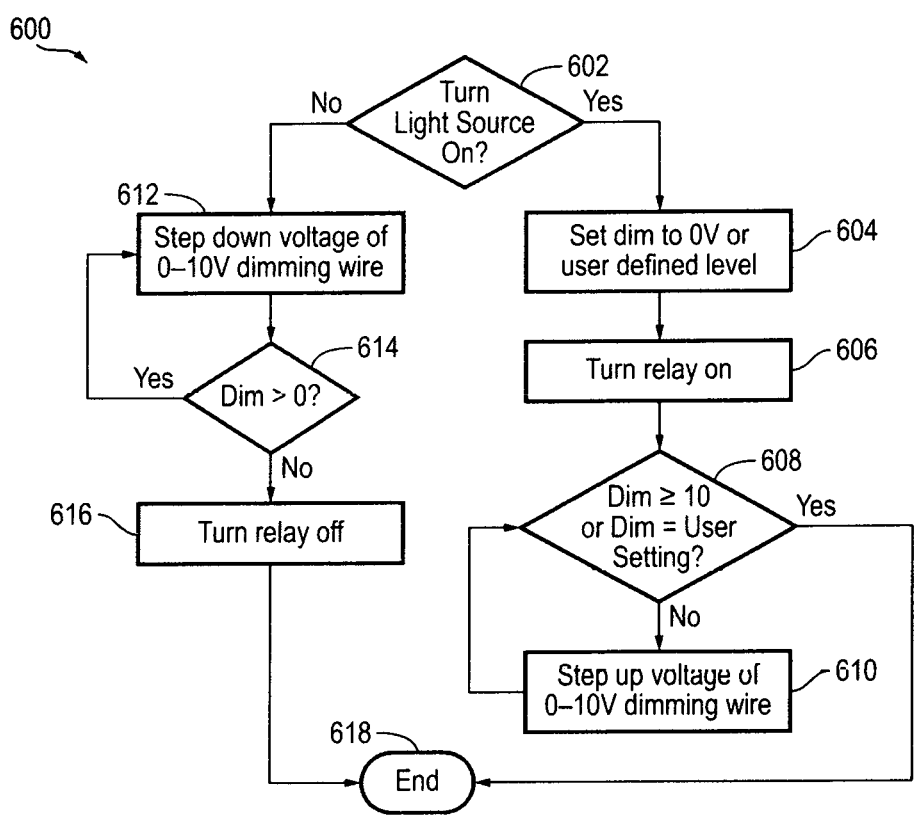
FIG. 6 illustrates an example process for turning on or off the light source, according to one embodiment

FIG. 6 illustrates an example process 600 for turning on or off the light source 130, according to one embodiment. The process 600 can be referred to as a soft switching process. The process 600 can implement any suitable features of the switch switching discussed herein. Any suitable firmware and/or electronic hardware can perform the process 600. For example, the motion sensor 120 of FIG. 1 (e.g., the soft switch relay controller 222 of FIG. 2A), the power pack 320 of FIGS. 3A-3B, and/or the soft switch relay controller 422 of FIG. 4 can be configured to execute the process 600. The process 600 begins at block 602.

At block 602, a determination is made as to whether to turn on the light source 130. If the light source 130 should be turned on, then the process 600 proceeds to block 604. Otherwise, if the light source 130 should be turned off, then the process 600 proceeds to block 612.

At block 604, a dim level is set to 0V or a predefined level such as a user-defined level. For example, the soft switch relay controller 222, 422 or power pack 320 can output 0V or a user-defined voltage level on the 0-10V driver dimming wire.

At block 606, the relay is turned on. The relay may be turned on in response to the soft switch relay controller 222, 422 or power pack 320 detecting that a current passing through the relay is at or near a minimal level (e.g., based on information provided by a power metering circuit of the relay) and/or in response to a threshold period of time passing (e.g., 300 ms).

At block 608, a determination is made as to whether the dim level is at least 10V or equal to a user-defined voltage setting. If the dim level is at least 10V or at the user-defined voltage setting, then the process 600 ends at block 618. At this stage, the light source 130 may be outputting light at the desired light output level. Otherwise, if the dim level is not at least 10V or at the user-defined voltage setting, then the process 600 proceeds to block 610.

At block 610, a voltage of the 0-10V driver dimming wire is stepped up. For example, the voltage may be stepped up by 1V or any other suitable increment. The voltage may be stepped up in response to the soft switch relay controller 222, 422 or power pack 320 receiving an indication that the relay contacts are stable and/or after a threshold period of time elapsing (e.g., 300 ms). After the voltage is stepped up, the process 600 proceeds back to block 608. Thus, block 608 and 610 may be repeated until the light source 130 is outputting the desired amount of light.

After determining not to turn on the light source, at block 612, a voltage of the 0-10V driver dimming wire is stepped down. For example, the voltage may be stepped down by 1V or any other suitable increment.

At block 614, a determination is made as to whether the dim level is greater than 0V (e.g., whether the voltage of the 0-10V driver dimming wire is greater than 0V). If the dim level is greater than 0V, then the process 600 proceeds back to block 612. Otherwise, if the dim level is not greater than 0V, then the process 600 proceeds to block 616.

At block 616, the relay is turned off. The relay may be turned off in response to the soft switch relay controller 222, 422 or power pack 320 detecting that a current passing through the relay is at or near a minimal level (e.g., based on information provided by a power metering circuit of the relay) or after a threshold period of time has passed (e.g., 300 ms). After the relay is turned off, the process 600 ends at block 618. At this stage, the light source 130 is not outputting light and/or outputting light at a light output level of 0%.

Terminology

Some or all of the methods and tasks described herein may be performed and fully automated by a motion sensor. The motion sensor typically includes a controller (e.g., a processor) (or multiple controllers) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the motion sensor. The results of the disclosed methods and tasks may be persistently stored by transforming physical storage devices, such as solid state memory chips and/or magnetic disks, into a different state.

Some or all of the methods and tasks described herein may also be performed and fully automated by a computer system, such as a user device. The computer system typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. The results of the disclosed methods and tasks may be persistently stored by transforming physical storage devices, such as solid state memory chips and/or magnetic disks, into a different state.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," "for example," such as," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are used and to be construed inclusively, in an open-ended fashion, and do not exclude additional elements, features, acts, operations, and so forth. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A motion sensor device comprising:
a motion sensor configured to detect motion of an object;
a relay configured to control whether a light source receives power; and
a controller coupled to the motion sensor and the relay, wherein a 0-10V driver dimming wire couples the controller and the light source, where an active high/low wire couples the controller and the relay, and wherein the controller is configured to:
receive a signal from the motion sensor indicating that motion of the object is detected;
output a first voltage on the 0-10V driver dimming wire that causes a current passing through the relay to reach a first level;
receive an indication from the relay that the current passing through the relay has reached the first level;
instruct the relay to close via the active high/low wire; and
output a second voltage on the 0-10V driver dimming wire, wherein the second voltage is higher than the first voltage.

2. A method of controlling switching of a relay, the method comprising:
receiving an instruction for turning on a light source from a motion sensor and in response to receiving the instruction;
outputting a first voltage on a 0-10V driver dimming wire that causes a current passing through a relay to reach a first level, wherein the 0-10V driver dimming wire couples a controller to the light source, and wherein the relay controls whether the light source receives power;
receiving an indication from the relay that the current passing through the relay has reached the first level;
controlling the relay to close after outputting the first voltage; and
outputting a second voltage on the 0-10V driver dimming wire, wherein the second voltage is higher than the first voltage.

3. A lighting control system comprising:
a device for providing control signals;
a relay configured to control whether a light source receives power;
a controller coupled to the relay and is configured to receive the control signals, and
a metering circuit coupled to the relay, wherein in response to receiving the control signals the controller outputs a first driver dimming voltage that causes a current passing through the relay to reach a first level, receives an indication from the metering circuit that the current passing through the relay has reached the first level, instructs the relay to close and outputs a second driver dimming voltage, wherein the second voltage is different than the first voltage.

4. A motion sensor device comprising a controller circuit that receives a signal from a motion sensor indicating that motion of an object is detected, wherein the controller circuit shorts a 0-10V driver dimming wire to first voltage on the 0-10V driver dimming wire, provides an indication that the 0-10V driver dimming wire has been shorted to the first voltage, instructs a relay to close, and then in response to closing the relay outputs a second voltage on the 0-10V driver dimming wire, wherein the second voltage is higher than the first voltage.

5. A soft switch relay circuit for controlling an output voltage from a 0-10 volt driver circuit, the soft switch relay circuit comprising a control circuit that electrically couples to a relay and that opens and closes the relay through a high/low wire in response to control signals and being configured to reduce a driver dimming voltage to the relay prior to closing the relay to provide a first output voltage and in response to closing the relay increasing the driver dimming voltage after the closing the relay to provide a second output voltage, wherein the second output voltage is higher than the first output voltage.

* * * * *